United States Patent [19]
Collins et al.

[11] 3,778,027
[45] Dec. 11, 1973

[54] QUICK CLOSING VALVE ACTUATOR

[75] Inventors: Richard Collins; Donald Denise, both of Denville, N.J.

[73] Assignee: Marotta Scientific Controls, Inc., Boonton, N.J.

[22] Filed: Sept. 25, 1972

[21] Appl. No.: 292,265

[52] U.S. Cl. ............... 251/297, 251/74, 251/81
[51] Int. Cl. ........................................ F16k 31/56
[58] Field of Search ............... 251/297, 291, 81, 251/77, 74

[56] References Cited
UNITED STATES PATENTS

| | | | |
|---|---|---|---|
| 3,040,772 | 6/1962 | Todd | 251/297 X |
| 2,733,729 | 2/1956 | Wolfe | 251/297 X |
| 3,115,330 | 12/1963 | Dollison | 251/74 X |
| 2,682,386 | 6/1954 | Lindsay | 251/74 |
| 2,082,643 | 6/1937 | Leece | 251/74 X |

Primary Examiner—Samuel Scott
Assistant Examiner—Ira S. Lazarus
Attorney—Nichol M. Sandoe et al. and Sandoe, Hopgood and Calimafde

[57] ABSTRACT

This valve is opened against the force of a spring by motion-transmitting means operated by a hand wheel or other conventional valve-operating mechanism. The invention provides quick release mechanism between the valve and hand wheel to release the valve from its connection with the hand wheel so that the spring can cause instantaneous closing of the valve. In the preferred construction, balls extending into the path of a spring retainer hold the spring under the load imparted to it by the hand wheel or other hand-operating mechanism. A release pin moves a groove under the balls so that they can move inward and out of the path of the spring retainer; and this causes the spring to advance the retainer into position to close the valve and hold it closed. Movement of the hand wheel and its connections into valve closed position resets the mechanism for reopening the valve.

16 Claims, 4 Drawing Figures

PATENTED DEC 11 1973　　　　　　　　　　　3,778,027

QUICK CLOSING VALVE ACTUATOR

BACKGROUND AND SUMMARY OF THE INVENTION

The valves operated by hand wheels and screws threads for obtaining substantial mechanical advantage cannot be closed instantaneously in the event of an emergency. It is an object of this invention to provide a valve which is opened by an actuator, such as a hand wheel, and which can be released from its actuator so as to close instantaneously as a result of the force of a compressed spring.

This invention obtains the instantaneous closing feature by having a clutch in the motion-transmitting connections between the actuator and the valve element. The clutch can be disengaged by operating a pin or other device from outside of the housing in which the valve-operating assembly is enclosed.

The preferred embodiment of the invention uses a clutch which has balls as the clutch elements. The balls are held outward in position to provide interferences for preventing relative sliding movement of coaxial parts of the motion-transmitting connection between the actuator and the valve element. The pin that releases the clutch is the element that holds the balls outward; and this pin has a groove in it which can be brought into alignment with the balls by merely pulling the pin axially. When the groove comes into alignment with the balls, the balls can move inward so that they no longer obstruct relative movement of parts of the motion-transmitting connections and a portion of the connections on the valve side of the clutch is released and instantaneously moved by spring pressure into position to close the valve.

Another feature of the invention is that the valve operating assembly is made in such a way that it can be applied to existing valve housings so as to replace conventional operating mechanism which does not have the instantaneous closing feature.

Other objects, features and advantages of the invention will appear or be pointed out as the description proceeds.

BRIEF DESCRIPTION OF DRAWINGS

In the drawings, forming a part hereof, in which like reference characters indicate corresponding parts in all the views:

FIG. 1 is a sectional view through a valve and valve housing and a valve-operating assembly made according to this invention is shown connected with the valve housing;

FIG. 2 is a fragmentary sectional view taken on the line 2—2 of FIG. 1;

FIG. 3 is a fragmentary sectional view taken on the line 3—3 of FIG. 2; and

FIG. 4 is an enlarged sectional view taken on the line 4—4 of FIG. 1.

DESCRIPTION OF PREFERRED EMBODIMENT

Figures 1, 2, 3, 4:
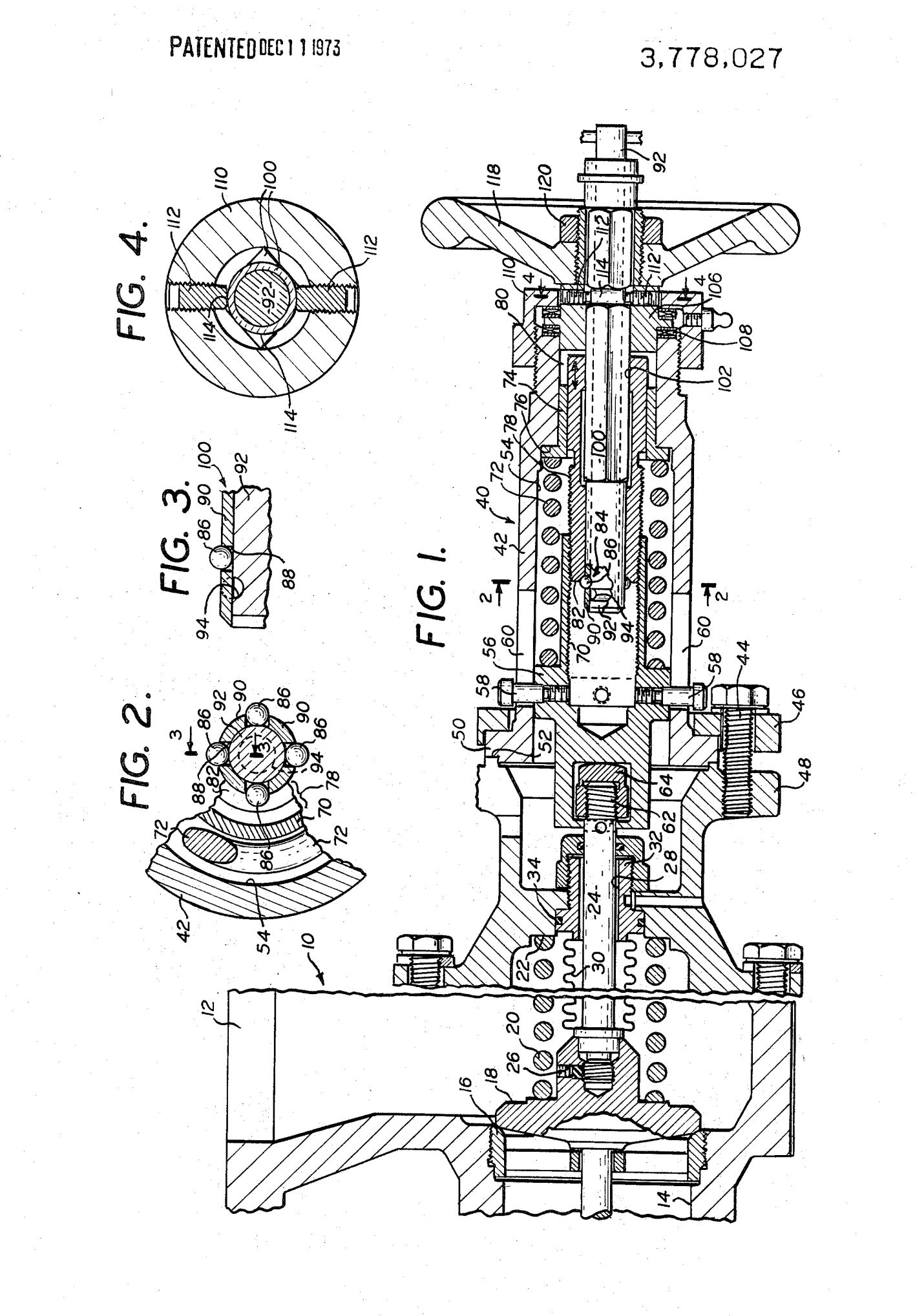

FIG. 1 shows a valve housing 10 which has an inlet passage 12 and an outlet passage 14 through a wall thereof. Within the housing 10 there is a valve seat 16 and a valve element 18 that closes against the seat 16 to stop flow of fluid from the inlet passage 12 to the outlet passage 14.

The valve element 18 is urged into closed position by a compression spring 20 which bears against the valve element 18 at one end and against a shoulder 22 of the valve housing 10.

a stem 24 is screwed into a boss on the valve element 18 and is held in position by a set screw 26. This stem 24 extends through a bearing 28 in a wall of the valve housing 10. In order to prevent escape of fluid from the interior of the valve housing along the bearing 28, there is a flexible bellows 30 secured to the stem 24 near the valve element 18, and secured at its other end to a bushing 32 in which the valve stem 24 slides on the bearing 28. This bushing 32 is sealed by an O-ring 34, or other suitable sealing means. The bellows 30, if made of metal, can be soldered or welded to the valve stem 24 and the bushing 32.

The structure thus far described is representative of a valve, and particularly a poppet valve which is urged into closed position by spring pressure and which is held in open position by a valve actuator. This invention can be used in combination with valves other than that shown and described above.

A valve actuator assembly 40 has a housing 42 which is attached to the valve housing 10 by fastening means comprising screws 44 extending through openings in a clamping ring 46 and threaded into lugs 48 of the valve housing 10. The clamping ring 46 clamps a flange 50 of the actuator housing 42 against an end face 52 of the valve housing 10.

By means of suitable adaptors, the valve-operating actuator 40 can be connected to the housing of various valves as a substitute for the pre-existing actuator or the valve so as to convert the valve from a conventional valve to one having the instantaneous closing feature of this invention.

For a substantial distance from its flanged end that contacts with the lugs 48, the housing 42 has a cylindrical portion 54 which contains a piston element 56. This piston element slides in the cylindrical portion 54 of the housing 42 but is held against rotation in the cylindrical portion 54 by projections comprising screws 58 which thread into the piston element 56 at angularly spaced locations around the circumference of the piston element 56. In the construction illustrated there are two such projection screws 58 and each one extends through a slot 60 in the wall of the cylindrical portion 54. Thus the piston element 56 has axial movement in the cylindrical portion 54 but cannot rotate about its axis. The sides of the screws 58 bear against the sides of the slots 60 to restrain the piston element 56 against rotary movement.

The left hand portion of element 56 (FIG. 1) is of reduced diameter and provided with a connection 62 to the valve stem 24. This connection is shown as a nut 64 threaded over the end of the valve stem 24 within a recess in the end of the piston element 56, but it will be evident that various other connections can be used. The construction shown is to be considered merely representative of a connection between the piston element 56 of the valve-operating assembly and the valve which is to be operated.

A first threaded element 70 extends from the right hand end of the piston element 56 and constitutes a part of the piston element, though of less diameter than the cylindrical portion 54 in which the piston element 56 has sliding axial movement. This first threaded element 70 is surrounded by a helical spring 72 that constitutes resilient means for urging the piston element 56 in a direction to close the valve element 18. The spring 72 is compressed between the full diameter portion of the piston element 56 and a shoulder of a bushing 74 at an end wall 76 of the housing 42.

A second threaded element 78 screws into the first threaded element 70. This second threaded element rotates in the bushing 74 and is also axially slidable in the bushing 74 along an unthreaded portion of the circumference of this second threaded element 78. This axial movement of the second threaded element 78 is indicated by the double-headed arrow 80 in FIG. 1.

When the second threaded element 78 is free to move axially, it moves as a unit with the piston element 56 as a result of the threaded connection between these elements 70 and 78.

Threaded element 78 has an end face 82, at least a portion of which is frusto-conical as shown in FIG. 1. This frusto-conical portion of the end face 82 is part of a clutch 84 which has clutch elements comprising balls 86 which contact with the end face 82 to prevent axial movement of the second threaded element 78 when the balls are in their outward position, as shown in FIG. 1, this being the engaged position of the clutch 84. The clutch elements or balls 86 are loosely retained in openings 88 in a sleeve 90.

The actuator for the clutch includes a quick release element consisting of a pin 92 that extends axially in the sleeve 90 and that has a diameter substantially equal to the inside diameter of the sleeve 90 but with running clearance so that the pin 92 can move freely in an axial direction in the sleeve 90 as a bearing. The balls 86 are of a diameter greater than the wall thickness of the sleeve 90 so that the pin 92 holds the balls 86 in a position projecting beyond the circumference of the sleeve 90 as shown in FIG. 3.

There is a depression 94 in the circumference of the pin 92 and this depression 94 constitutes a groove extending around the entire circumference of the pin 92 in a plane normal to the axis of the pin 92. This depression or groove 94 is clearly shown in both FIGS. 1 and 3 and it is deep enough so that when it is brought into alignment with the balls 86, by moving the pin 92 axially, the balls 86 can move radially inward far enough so that they are within a circle equal to the outside circumference of the sleeve 90.

When not held in their outwardly projected positions, as shown in FIGS. 2 and 3, the balls 86 are forced inward by the frusto-conical portion of the end face 82 (FIG. 1). This frusto-conical surface provides a cam for forcing the balls 86 inwardly to disengage the clutch whenever the balls 86 are free to move inwardly. The force of the frusto-conical cam face is supplied by the spring 72 whenever the piston element 56 is pulled back to compress the spring and the poppet valve element 18 is not against the seat.

The slot 94 in the pin 92 can have an axial extent substantially greater than the diameters of the balls 96, if desired, but the walls of the groove 94 slope so that they exert a cam action on the balls 86 to again move them outwardly when such outward movement is not prevented by contact of the balls 86 with the inside surface of the second threaded element 78.

The sleeve 90 is an end portion of a hollow shaft 100 which extends through an opening 102 in the right hand end of the second threaded element 78. This opening 102 is non-circular and the cross-section of the shaft 100 beyond the sleeve portion 90 is of the same non-circular cross section as the opening 102. In the construction illustrated in FIG. 1, the shaft 100 is shown square but it can have other polygonal cross section corresponding to that of the opening 102. The purpose of this non-circular opening 102 is to permit axial movement of the second threaded element 78 along the shaft 100 and to compel the second threaded element 78 to rotate as a unit with the shaft 100 for purposes which will be explained.

A collar 106 also surrounds the shaft 100 and this collar has an opening through which the shaft 100 extends; the opening being of the same cross section as a non circular portion of the shaft 100. Thus the collar 106 rotates as a unit with the shaft 100; and the collar 106 is held against axial movement by thrust bearings 108 on opposite sides of the collar 106 and around the entire periphery of the collar. These thrust bearings 108 are confined between the end of the housing 42 and a cap 110 which screws over the end portion of the housing 42.

The collar 106 carries radially extending screws 112, two such screws being shown in FIG. 1. These screws 112 have unthreaded end portions which extend into a circumferential groove 114 in the shaft 100. This groove 114 being cylindrical, has side walls that contact with the screws 112 to prevent axial movement of the shaft 100 in a rearward direction with respect to the collar 106. Since the collar 106 cannot move axially because of the thrust bearing 108, the shaft 100 is thus held in the housing 42 in such a way that it can rotate but cannot move axially.

The collar 106 has an end portion, beyond the housing 42, which is threaded to receive a hand wheel 118, and this hand wheel is secured to the collar 106 by a lock nut 120.

The hollow shaft 100 preferably has an inside diameter along its entire length equal to the inside diameter of the sleeve 90 which constitutes the left hand end of the shaft 100. This pin or shaft 92 extends beyond the hand wheel 118 and lock nut 120.

In order to disengage the clutch 84, the actuator pin 92 is moved to the right at FIG. 4 far enough to bring the groove 94 into alignment with the clutch elements or balls 86 so that the frusto-conical cam surface of the second threaded element 78 can push the balls 86 into the groove 94 where they no longer obstruct axial movement of the second threaded element 78. The spring 72 then moves the piston element 56 and the first and second threaded elements 70 and 78, respectively, to the left in FIG. 1 until the valve element 18 is against the seat 16 and the valve is closed. The valve element 18 reaches closed position before the movement of the piston element 56 is stopped by contact of the projecting screws 58 against the ends of the slots 60.

In the construction illustrated the clutch is disengaged by moving the pin 92 to the right in FIG. 1; that is, by pulling the pin outwardly. It will be evident that by locating the depression 94 on the other side of the balls 88; that is, to the right of the balls in FIG. 1 instead of to the left, the clutch can be disengaged by pushing the pin 92 inwardly. Thus the apparatus can be made to operate by either pulling the pin 92 which constitutes the actuator for the clutch, or by pushing it.

When the valve is initially opened, the hand wheel 118 is rotated and this rotates the shaft 100 and the second threaded element 78 as the result of the non-circular cross section of the opening 102 of the second threaded element. This rotation of the second threaded element 78 causes it to pull the first threaded element to the right in FIG. 1 since the second threaded element cannot move toward the left because of the obstruction provided by the balls 86 when the clutch is engaged. The piston element 56 moves toward the right and compresses the spring 72 while at the same time moving the valve 18 into open position.

Whenever it becomes desirable to instantaneously close the valve element 18, the actuator pin 92 is pushed or pulled as necessary to bring the depression 94 into alignment with the clutch elements comprising the balls 88 and the inward movement of the balls, as already described, leaves the combination of the first and second threaded elements free to move axially. The spring 72 then pushes the piston element 56 and its first threaded element 70 and the second threaded element 78 to the left as a unit permitting the valve element 18 to be slammed shut by the spring 72.

When the valve-operating element is to be re-armed, the hand wheel 118 is rotated to screw the second threaded element 78 back along the first threaded element 70 far enough to bring the end face 82 of the second threaded element into a position, as shown in FIG. 1, where the clutch can again be engaged by thrusting the balls 86 outwardly into position to interfere with axial movement of the second threaded element 78 toward the left.

Rotation of the hand wheel 118 in the opposite direction will then open the valve as previously described since the second threaded element can no longer move axially.

The preferred embodiment of the invention has been illustrated and described, but changes and modifications can be made, and some features can be used in different combinations without departing from the invention as defined in the claims.

What is claimed is:

1. A valve-operating assembly including in combination a housing, a piston element movable back and forth in the housing for imparting movement to a valve element, resilient means behind the piston and urging the piston in a direction to close the valve, a valve operator, motion-transmitting connections between the valve operator and the piston for moving the piston back and forth in the housing, said motion-transmitting connections including a clutch, movable into an engaged position in which the clutch causes the operator to pull the piston back against the force of the resilient means, and a quick release element movable into position to disengage the clutch so that the piston is moved by the resilient means independently of the operator, said quick release element having an actuator operable from outside the housing.

2. The valve-operating assembly described in claim 1 characterized by the resilient means being a spring compressed between the piston and a wall of the housing.

3. The valve-operating assembly described in claim 1 characterized by the motion-transmitting connections including a first threaded element that is connected with the piston, a second threaded element that engages the threads of the first threaded element and that is held against movement axially of the piston by portions of the clutch when the clutch is in its engaged position, and a bearing on which the second threaded element moves as a unit when the clutch is disengaged.

4. The valve-operating assembly described in claim 3 characterized by a projection from the first threaded element, a guide on the housing extending in the direction of the axial movement of the piston for receiving said projections and for holding the first threaded element against rotation while leaving it free to move as a unit with the piston.

5. The valve-operating assembly described in claim 3 characterized by the motion-transmitting connections including also a shaft that extends through an opening in the second threaded element, the cross section of said opening and said shaft being non-circular so that rotation of the shaft rotates the second threaded element, but the second threaded element is free to slide along the shaft in the direction of movement of the piston.

6. The valve-operating assembly described in claim 5 characterized by thrust bearings holding the shaft against movement axially of the piston, bearing means on which the shaft is rotatable, and a hand wheel connected with the shaft for imparting rotation to the shaft.

7. The valve operating assembly described in claim 5 characterized by the opening in the second threaded element in which the shaft slides being of polygonal cross section and the shaft having a polygonal cross section that fits with a sliding fit in the opening the the second threaded element.

8. The valve-operating assembly described in claim 6 characterized by the opening in the second threaded element in which the shaft slides being of polygonal cross section and the shaft having a polygonal cross section that fits with a sliding fit in the opening in the second threaded element, a projection from the first threaded element, a guide on the housing extending in the direction of axial movement of the piston, the projection contacting the guide for holding the first threaded element against rotation while leaving it free to move as a unit with the piston.

9. The valve-operating assembly described in claim 8 characterized by the resilient means being a spring compressed between the piston and a wall of the housing, the first threaded element being a portion of the piston and having a shoulder at one end against which the spring contacts to urge the piston in a direction to close the valve against its seat, a shoulder in the housing against which the other end of the spring thrusts, the spring being compressed by action of the second threaded element rotating in the threads of the first threaded element and pulling the first threaded element back in a direction to compress the spring, the clutch elements holding the second threaded element against movement along the shaft when the clutch is engaged, and the second threaded element being axially movable along the shaft by said spring when the clutch is disengaged.

10. The valve-operating assembly described in claim 9 characterized by the clutch including a sleeve portion of the shaft with openings therethrough in which the balls are retained, a pin extending axially through the shaft and against which the balls bottom when the clutch is engaged, said balls being of diameters greater than the thickness of the sleeve so that the balls project beyond the periphery of the sleeve when the clutch is connected, the pin having a depression therein that is brought under the balls when the pin is moved into position to disengage the clutch, the depression being deep enough for the balls to be moved within the circle of the periphery of the sleeve, the balls being in position to hold the second threaded element against movement along the shaft when projected beyond the periphery of the sleeve.

11. The valve-operating assembly described in claim 1 characterized by the clutch consisting of parts of the motion-transmitting connections that have axial sliding movement with respect to one another, a clutch element carried by one of the sliding parts for preventing said sliding movement of said parts when the clutch element is in its engaged position, said clutch element being held in engaged position by a surface of said quick release element, said surface being movable with the quick release element away from the clutch element so that the clutch element is free to move into disengaged position and the parts of the motion-transmitting elements can slide axially with respect to one another.

12. The valve-operating assembly described in claim 11 characterized by the parts that have axial sliding movement being an outer tube and an inner tube which slides within the outer tube, the quick release element being a shaft that slides within the inner tube, the clutch element comprising a circumferential line of angularly spaced balls, each of which is held in an opening through the inner tube, the diameter of the balls being greater than the thickness of the wall of the inner tube so that a portion of the shaft that fits with a sliding fit into the inner tube holds the balls in positions projecting from the outer circumference of the inner tube to prevent said end wall of the outer tube from moving past the line of balls, the shaft having a portion of its length of smaller diameter than the inside diameter of the inner tube, said smaller diameter providing clearance into which the balls move to leave the radially outer limits of the balls within the inside circumference of the outer tube so that the outer tube can slide past the line of balls.

13. The valve-operating assembly described in claim 12 characterized by the small diameter portion of the shaft being a circumferential groove in the outside surface of the shaft, and the end face of the outer tube having a frusto-conical slope in a direction to exert a cam action for pushing the balls radially inward and into said groove when the groove comes into alignment under the balls.

14. The valve-operating assembly described in claim 1 characterized by an end face of the valve-operating assembly for contact with a valve housing, and fastening means for connecting the valve assembly with the housing in alignment with a valve actuator for a valve in said housing, the valve actuator being accessible to the valve-operating assembly from outside of the valve housing.

15. The valve-operating assembly described in claim 1 characterized by a valve housing to which the valve-operating assembly is connected, inlet and outlet passages for the valve housing, a valve seat and valve element in the valve housing between the inlet and outlet passages, the valve seat and the valve element being relatively movable toward and from each other for shifting the valve element between open and closed positions to establish and shut off, respectively, communication between the inlet and outlet passages, the valve being connected with the piston element and movable into open position when the piston element moves in a direction to load said resilient means.

16. The valve-operating assembly described in claim 15 characterized by the valve element that moves toward and from the seat being on the side of the seat that is nearer to the valve-operating assembly, a stem extending from the valve element, bearings in which the valve stem slides as it moves toward and from the seat, at least a portion of the valve stem being in alignment with the piston and connected with the piston, and a bellows surrounding said portion of the valve stem and sealed at one end to the valve element and at the other end to the valve housing.

* * * * *